June 30, 1964 H. A. STEELMAN 3,139,557
OVERLOAD PROTECTION DEVICE FOR POLYPHASE SYSTEMS
Filed Sept. 9, 1960
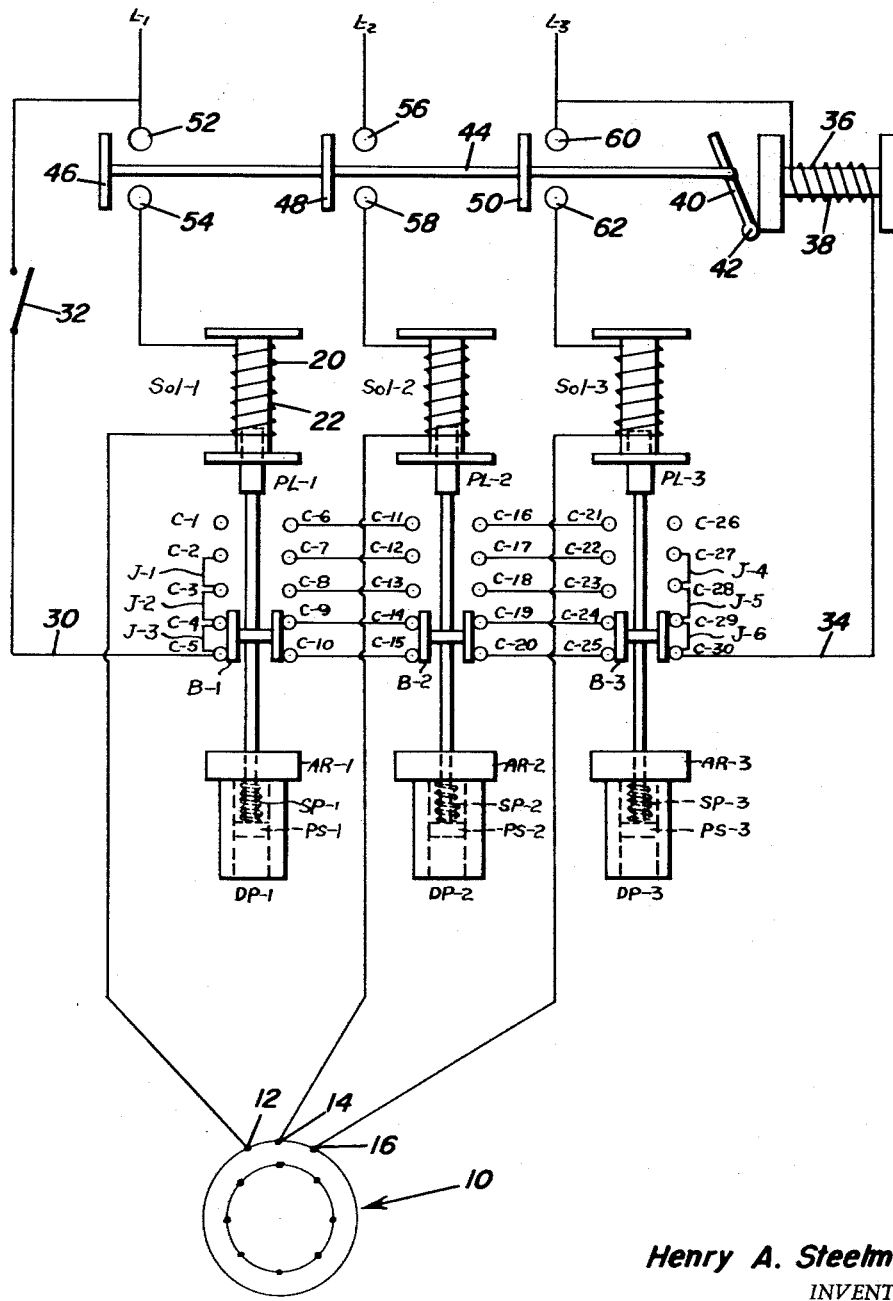
Henry A. Steelman
INVENTOR.

United States Patent Office 3,139,557
Patented June 30, 1964

---

3,139,557
OVERLOAD PROTECTION DEVICE FOR
POLYPHASE SYSTEMS
Henry A. Steelman, P.O. Box 953, Kilgore, Tex., assignor of fifty percent to Steelman Electric Manufacturing Company, Inc., Kilgore, Tex., a corporation of Texas
Filed Sept. 9, 1960, Ser. No. 55,060
5 Claims. (Cl. 317—27)

This invention relates generally to electrical equipment and more particularly to an overload protection device for polyphase systems.

When polyphase loads are energized from polyphase lines, it is extremely desirable to assure a somewhat balanced load current condition. More particularly, it is desirable and necessary to maintain the current in each of the phase lines at an approximately equal value for proper operation of the load. Of the polyphase systems now employed, amongst the most common is the use of a three-phase motor driven from a three-phase source of energy. Accordingly, the description below is particularly directed to a three-phase supply and three-phase load. However, it is to be appreciated that the invention herein may be used with a polyphase system having an $n$ phase supply and an $n$ phase load. If an extreme unbalanced condition does exist between the phase lines, it is desirable to employ current control means to either equalize the unbalance or interrupt the operation of the load by opening up the phase supply lines. The invention herein provides means for detecting the unbalanced condition and shows how the means may be employed with a conventional current control or interrupter device to halt operation of the load. Thus, the protective system of the present invention will not only respond to excessive phase currents or failure of a phase line as systems heretofore did, but will also open the load circuit when any substantial difference between phase currents is detected indicative of an unbalanced condition.

The invention to be pairticularly described below is an electrical overload tripping device designed to be used in conjunction with any electromagnetically held current interrupting device or switch that is used to start, stop, or control in any manner any electric load and particularly electric motors. The most distinctive feature of the invention, especially when used with a three-phase alternating current motor, is its ability to provide positive, precise, and instantaneous protection to the motor from overload, short circuit, or abnormal circuit conditions. This distinctive feature results from a novel and unique contact and circuit arrangement of the protective elements. It is accordingly the principal object of this invention to provide a novel overload protection device for polyphase systems which more assuredly operates to protect a polyphase load.

It is a more particular object of this invention to provide a novel overload protection device for polyphase systems which is extremely simple in construction and circuitry and which accordingly is inexpensive to install and employ.

More particularly, it is an object of this invention to provide a novel overload device for polyphase systems which prevents load damage resulting from overload, short circuit, or abnormal circuit conditions. The invention provides means for detecting unbalanced current in the phase lines and when the unbalance exceeds a predetermined amount, a current control device is energized to start, stop, or control in any manner the supply to the load. Inasmuch as the construction and circuitry of the invention are relatively simple, the invention should have the extremely important characteristic necessary in protection devices of reliability. Moreover, due to the simplictiy of the circuitry and structure, the invention is substantially maintenance free.

The accompanying drawing, to which particular reference is made below, illustrates specifically the circuit arrangement of the invention in schematic form and shows in elevation certain structural elements utilized to respond to circuit current conditions.

Attention is now called to the accompanying drawing wherein the invention is described in conjunction with a three-phase system, it of course being understood that the teachings are equally useful with a polyphase system of $n$ phases. It is desired to drive a polyphase load in the form of a motor 10 which is provided with three terminals 12, 14 and 16. Phase lines L–1, L–2 and L–3 are to be respectively connected to the terminals 12, 14 and 16 of the load 10. However, in order to protect the motor 10, it is desirable that means be provided to control the current thereto and to stop operation of the motor 10 in the event of a serious unbalanced condition between the current in the phase lines L–1, L–2 and L–3.

In each of the phase lines L–1, L–2 and L–3, an operative phase current responsive unit is electrically interposed. Each of the units includes a displacing force generating solenoid serially connected in the phase line between the line input and the terminals 12, 14 and 16 on the motor 10 for measuring the phase line current. Each of the solenoids includes a coil 20 wound on a hollow core 22. Position responsive switch means is associated with each phase current responsive unit including a switch actuator mounted for reciprocal movement within the core 22. The switch actuator includes a plunger to which is attached a rod 24. The units in each of the phase lines are identical. The solenoid Sol–1 includes the hollow core 22 on which is wound the coil 20 with the coil being of insulated wire, the size of which is determined by the horse power and voltage rating of the motor 10 to be protected. The plunger PL–1 is slidable inside the hollow core. The plunger of course is made of magnetic material and is of such a size as to move freely in and out of the hollow core 22. The rod 24 secured to the plunger PL–1 is insulated and carries a multi-position switch contact brush B–1 thereon. The contact brush B–1 is an H-shaped structure having vertical side brush portions and a conductive cross portion connecting the brush portions. The cross portion is secured to the rod 24. The end of rod 24 remote from the solenoid coil 20 is connected to a conventional dashpot DP–1. The dashpot is composed of a hollow cylinder with a close fitting piston PS–1, a spring SP–1, and an adjustable ring AR–1. The piston PS–1 is attached to the rod 24 and moves up and down inside the DP–1 immersed in oil or such. Its travel, of course, is limited and adjusted by setting ring AR–1. Inasmuch as the units in lines 2 and 3 are identical to the unit in line 1, particular reference will not be made to them.

Rows of spaced contacts are supported on either side of the contact brushes carried by the rods of each of the units. In unit 1, a first row of contacts includes vertically spaced contacts C–1 through C–5. A second row of contacts includes contacts C–6 through C–10. Likewise, a first row of contacts in unit 2 includes contacts C–11 through C–15 while the second row includes contacts C–16 through C–20. In unit 3, the first row includes contacts C–21 through C–25, while the second row includes contacts C–26 through C–30. The contacts of each of the rows are vertically spaced with the vertically spaced contacts being horizontally aligned. It will be appreciated that the contacts of the second row of unit 1 and the first row of unit 2 in horizontal alignment are connected to each other. Likewise, the contacts on the second row of unit 2 are connected with horizontally aligned contacts of the first row of unit 3. Jumper wires J–1, J–2 and J–3 connect respectively contacts C–2 and C–3, and C–3 and C–4, and C–4 and C–5. Likewise, jumper wires J–4, J–5, and J–6 connect contacts C–27 and C–28, and C–28 and C–29, and C–29 and C–30, respectively. Conductor 30 is connected between contacts C–5 through master switch 32 to phase line L–1. Conductor 34 is connected from contact C–30 to coil 36 and, in turn, to phase line L–3. A circuit breaker including an operating coil 36 is wound on core 42. Armature 40 is pivotally mounted at 42. Armature 40 is mounted so as to pivot clockwise in response to energization of coil 36. Member 44 is secured to armature 40. Member 44 of the circuit breaker carries bridging bars 46, 48, and 50. The bridging bars 46, 48 and 50, respectively cooperate with spaced contacts 52, 54, and 56, 58 and 60, 62, respectively, in the phase lines L–1, L–2 and L–3.

In operation, the three individual units in the lines L–1, L–2 and L–3 are electrically connected as indicated in the drawings by means of interconnecting wires between most of the stationary contacts C–1 to C–30. The electromagnetic contactor including the coil 36 and core 38 and associated equipment is connected between the contact C–30 and phase line L–3. It is to be particularly appreciated that the specific electromagnetic contactor shown herein does not form part of this invention and any current control device may be employed.

The sequence of operation of the invention is as follows: Phase lines L–1, L–2 and L–3 are connected to the supply lines providing current to the motor 10. Terminals 12, 14 and 16 are connected to the phase lines. When start switch 32 is closed, a complete current path is provided from L–1 to contact C–5 through contact brush B–1 to C–10, and in turn to C–15 through brush B–2 to contacts C–20 and in turn to contact C–25 through contact brush B–3 to contact C–30. It is of course to be appreciated that the vertical brush portions of the brushes are of a length sufficient to bridge a pair of vertically spaced contacts in each row. Conductor 34 connects contact C–30 to coil 36 with coil 36 in turn being connected to phase line L–3. Under these conditions, a full line voltage is impressed across the coil 36 thereby energizing it, so as to carry the bridging bars 46, 48 and 50 into bridging relationship with contacts 52, 54, and 56, 58 and 60, 62, respectively. When this condition is established, of course, current flows from each of the phase lines L–1, L–2 and L–3 through the solenoid coils of each of the units to the terminals 12, 14 and 16. As the current flows from the main line wires through each of the solenoid coils in each of the phase lines, a magnetic field is established in each of the solenoid coils, thereby attracting each of the plungers PL–1, PL–2, and PL–3 respectively. Prior to the application of current to the motor 10, contact brush B–1, B–2, and B–3 were resting at the lower position of each unit, namely C–5, C–15 and C–25, respectively.

Under normal operating conditions of the motor 10, the current in each of the phase lines L–1, L–2 and L–3, will be equal and each plunger will be displaced by equal distances proportional to the quantity of current flowing through each of the solenoid coils 20 as independent measurements of the phase currents. The length of travel and smoothness of travel of course is governed and limited by the hydraulic action of the dashpots. As long as the current in each of the phase lines is substantially equal, contact brushes B–1, B–2 and B–3 will be at the same vertical position in each of the three units and accordingly a complete circuit will be established from phase line L–1 through switch 32, through a parallel circuit branch between the stationary contacts, through conductor 34, through coil 36 to line L–3. This will keep the coil 36 energized as long as normal circuit conditions exists. However, when a short circuit or power failure in any one of the phase lines results in an abnormal current unbalance rise in that line, the field created by the solenoid coil 20 in the particular unit connected to the particular phase line increases, causing it to displace its plunger to a different vertical position with respect to the plungers of the other two units. When the unbalance is significant, of course, an open circuit will exist between conductors 30 and 34. It will be appreciated however that a slight unbalance will not open the completed branch circuit between conductors 30 and 34. For example, assume brush B–1 remains in the position shown and brush B–2 moves one step vertically so as to engage contacts C–13 and C–14, moving out of engagement with contact C–15. When this occurs, a complete circuit will still exist between conductors 30 and 34. However, if further unbalance exists and brush B–2 moves vertically still further, the circuit between conductors 30 and 34 will open. Also, extremely high phase line current developed in at least one of the phase lines would be operative to open the circuit. For example, excessive current in lines L–1 or L–3 would displace the rod 24 so that either contact C–1 or C–26 is bridged in which case protective action of the circuit breaker occurs even if the phase currents are not excessively unbalanced. Of course, when the circuit between conductors 30 and 34 opens, the coil 36 becomes deenergized and the supply to motor 10 is interrupted. The particular relative cut-off position of the device may be adjusted by adjustment of the dashport and particularly the adjustment ring AR–1, AR–2 and AR–3. Also, adjustment may be accomplished by connecting conductors 30 and 34 to different contacts from the ones shown in the drawing.

From the foregoing, it should be appreciated that applicant has herein disclosed a novel overload protection device for polyphase systems wherein significant unbalanced conditions may be detected and employed to control the energy supply to the load. It will, of course, be understood however that a slight unbalance may be tolerated without interrupting or controlling the supply to the load.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A protective circuit system for polyphase networks having a plurality of phase lines opened upon deenergization of a circuit breaker coil comprising, current responsive displacing means operatively connected to each of said phase lines for development of displacing forces in response to flow of phase currents, a contact closing element connected to each of said displacing means for displacement to a plurality of current measuring positions in accordance with said phase currents, a plurality of parallel branch circuits electrically connected only between one of the phase lines and the circuit breaker coil for energization thereof, each branch circuit including a pair of contacts associated with each of said phase lines and adapted to be electrically interconnected by one of the contact closing elements in at least one of the current measuring positions thereof, each of said contact closing elements bridging at least two pairs of contacts in the current measuring positions thereof for completing at least one of the parallel branch circuits except when at least two of the contact closing elements are in substantially different current measuring positions.

2. The combination of claim 1, wherein each of said displacing means comprises a solenoid coil in each of said phase lines, armature means magnetically coupled to said solenoid coil and movement retarding means operatively connected to said armature means.

3. In combination with a polyphase system having a plurality of phase lines connected to a polyphase load through a phase line opening circuit breaker, protective means comprising; energizing circuit means electrically connecting said circuit breaker across two of said phase lines for opening all of said phase lines, current responsive means operatively connected in each of said phase lines for independently measuring phase currents therein, and position responsive switch means electrically connected to said energizing circuit means for opening thereof in response to a predetermined difference between said phase current measurements in any two of said phase lines, said energizing circuit means including solely a plurality of parallel branch circuits through which the circuit breaker is alternatively energized, said current responsive means including a plurality of displaceable armatures corresponding to the respective phase lines and coil means electrically connected in each of said phase lines for displacement of the armatures by amounts constituting said measurements of the phase line currents, said position responsive switch means comprises, a plurality of fixedly spaced pairs of contacts corresponding to each phase line, each pair of contacts being connected in one of said parallel branch circuits, and contact bridging brush elements mounted on each of the displaceable armatures bridging at least two of said contacts for closing at least one of said parallel branch circuits when none of the phase current measurements differ by more than said predetermined difference.

4. In combination with a polyphase system having a plurality of phase lines connected to a polyphase load through a phase line opening circuit breaker, protective means comprising; energizing circuit means electrically connecting said circuit breaker across two of said phase lines for opening all of said phase lines when opened, said circuit means including solely a plurality of branches for alternatively conducting energizing current between said two phase lines, each branch having a pair of fixed contacts associated with each of said plurality of phase lines adapted to be bridged for rendering the branch operative to conduct energizing current, means electrically connecting said two phase lines in parallel with all but one of said branches, and a plurality of current responsive devices for closing said energizing circuit means when none of the phase currents in said phase differs from another by a predetermined amount and none are above a maximum value, each current responsive device including, current measuring coil means connected in one of the phase lines, armature means displaceable by the coil means to a phase current measuring position, and brush means mounted on the armature means for bridging different pairs of contacts in the phase current measuring positions thereof.

5. The combination of claim 4 including movement retarding means operatively connected to said armature means.

References Cited in the file of this patent

UNITED STATES PATENTS

| | | |
|---|---|---|
| 885,446 | Crocker | Apr. 21, 1908 |
| 1,116,566 | Conrad | Nov. 10, 1914 |
| 1,134,752 | Leonard | Apr. 6, 1915 |
| 1,775,658 | Seeger | Sept. 16, 1930 |
| 1,800,256 | Keller | Apr. 14, 1931 |
| 2,609,425 | Turnupseed | Sept. 2, 1952 |

FOREIGN PATENTS

| | | |
|---|---|---|
| 370,313 | Germany | Mar. 1, 1923 |